Patented Oct. 19, 1943

2,332,460

UNITED STATES PATENT OFFICE 2,332,460

POLYMERIZED ESTERS OF POLYMERIC UN-SATURATED ALCOHOLS AND METHOD OF MANUFACTURE THEREOF

Irving E. Muskat and Maxwell A. Pollack, Akron, Ohio, assignors to Pittsburgh Plate Glass Company, Allegheny County, Pa., a corporation of Pennsylvania No Drawing. Application August 10, 1939, Serial No. 289,449

9 Claims. (Cl. 260—83)

This invention relates to polymerizable derivatives which may be secured from fusible polymers of unsaturated compounds and is particularly related to the polymerizable derivatives which may be secured from fusible polymers of unsaturated alcohols or salts, esters, or other derivatives thereof. In accordance with our invention, we have found that desirable products may be obtained by treating such polymers to introduce a plurality of unsaturated groups and thus to produce unsaturated polymers. These unsaturated polymers may be polymerized to form hard, substantially infusible and insoluble polymers, many of which are transparent, colorless and possess glass-like properties.

The invention has been found to be particularly applicable to the treatment of polymers of the lower unsaturated alcohols such as polyallyl, alcohol, polyvinyl alcohol, polycrotyl alcohol, polymethallyl alcohol, poly-2 chloroallyl alcohol, 2-fluorallyl alcohol, or the derivatives thereof, such as the corresponding halides such as polyvinyl chloride, polyallyl chloride, polymethallyl chloride, polymerized vinylidene chloride, polycrotyl chloride, polyvinyl esters such as polyvinyl acetate or butyrate, etc., esters of polyallyl alcohol such as polyallyl acetate, polyallyl butyrate, chloride, nitrate, oxalate, etc., polycrotyl esters or salts such as polycrotyl chloride, nitrate, cyanide, acetate, etc., or esters or salts of other similar polyalcohols, such as polymerized 2-chloroallyl alcohol, methallyl alcohol, propargyl alcohol, 3-butenyl alcohol, allyl ethyl alcohol, etc.

These materials may be treated in convenient manner to introduce unsaturated polymerizable radicles therein. Thus, the polymerized unsaturated alcohols such as polyvinyl or polyallyl alcohol may be esterified with polymerizable unsaturated acids such as crotonic, maleic, acrylic, methacrylic or alpha chloroacrylic acids to form the corresponding acrylates, methacrylates, chloroacrylates or crotonates.

Copolymers also may be treated in accordance with the present invention. Thus, a vinyl halide or organic ester such as vinyl acetate, vinyl chloride, etc. may be polymerized with an acrylic compound such as chloroacrylic acid, methacrylic acid or esters, amides or nitriles thereof and the copolymers may be treated to introduce unsaturated groups. Similarly, polyallyl or polycrotyl derivatives may be obtained by copolymerizing allyl or crotyl alcohol or esters thereof such as the oxalic, phosphoric, tartaric, or boric esters, etc. with other polymerizable materials such as the acrylates, vinyl compounds, e. g., vinyl chloride, vinyl acetate, vinyl butyrate, vinylidene chloride, etc. The copolymers may then be treated to hydrolyze the ester groups (oxalate, etc.) from the allyl group thereby forming a polyallyl alcohol copolymer which may be treated to form unsaturated derivatives as herein described.

In many cases compounds containing two or more types of unsaturated groups of the same or different activity may be secured. Thus, polymeric alcohols may be esterified with mixtures of saturated and unsaturated acids such as mixtures of acetic or butyric acid with acrylic, methacrylic or crotonic acid. In similar manner, polymeric esters such as polyvinyl acetate, polyallyl acetate, polyallyl oxalate, etc., may be partially hydrolyzed and the free hydroxyl groups esterified in the manner described herein for introduction of unsaturated radicles.

The products thus obtained may be polymerized in the presence or absence of heat, light and/or catalysts to form hard, infusible products which are generally colorless and transparent and are not appreciably effected by the action of solvents. By regulation of the degree of polymerization of the agent undergoing treatment, it is possible to produce products having a wide range of characteristics. Thus, by treating allylic, vinylic or similar polymers of high molecular weight, flexible and durable articles may be obtained while by treating polymers which are somewhat lower in molecular weight, harder products which may be somewhat less flexible may be secured. It is also possible to control the properties of the final polymer very accurately by regulating the amount of unsaturated groups which are introduced per unit of polymer. This may be done, for example, by treating a saturated polyacrylate such as methyl polymethacrylate with allyl or other unsaturated alcohol using an amount of alcohol which is insufficient to permit complete ester interchange, or stopping the interchange at any desired degree of reaction. Similarly, polyacrylic chloride or nitrile may be treated with a mixture of an unsaturated and a saturated alcohol such as a mixture of methyl and allyl alcohol. If hard, brittle products are desired, the number of allyl, vinyl or other groups will be preferably high, while if softer more flexible products are desired, the amount of unsaturated groups is decreased. In any case, it is generally preferred to introduce at least 30 percent of the theoretical amount of allyl or unsaturated ester groups which may be introduced. When unsaturated groups are introduced into polymers of unsaturated acids or their derivatives, the esterification may be conducted by heating the saturated polyacrylate, alpha-substituted polyacrylate, polycrotonate, etc., in the presence of the desired alcohol, with or without catalysts, such as sulphuric acid, p-toluenesulphonic acid or alkali metal compounds such as sodium methoxide, etc. Inhibitors such as hydroquinone, sulfur, copper compounds, phenylene diamine, etc., may be introduced to prevent polymerization of the material during treatment, if necessary. If desired, suitable diluents or solvents may be incorporated to promote reaction. The unsaturated esters after preparation may be recovered by distillation of the solvent or diluent and excess alcohol if desired, or they may be obtained by precipitation methods through use of a nonsolvent such as water, methyl or ethyl alcohol, etc.

The introduction of the unsaturated groups may often be effected most conveniently by conducting the reaction in a solvent for the polymer undergoing treatment. However, the polymer may be dispersed or emulsified in a suitable reaction medium, if desired, or if only a superficial reaction is desired, the reaction may be conducted by exposing the surface of a sheet of the polymer to the action of reagents for the introduction of the unsaturated groups.

The unsaturated polymers so produced have many characteristics which are common to the polymer from which they are derived. Generally speaking, they are soluble in the same organic solvents as the polymer from which they are derived. In addition, they are fusible and may be molded into convenient shapes.

The following example is illustrative:

*Example* 1—Upon digesting a polymer of allyl oxalate with aqueous sodium hydroxide, a solution was formed which contained oxalic acid and a polymer of allyl alcohol. This polymer was insoluble in toluene and carbon tetrachloride, although easily soluble in water, ethylene glycol, and related solvents. When heated with acrylic acid in the presence of one percent of p-toluenesulphonic acid, a polymer of allyl acrylate was formed which was insoluble in water and ethylene glycol, although soluble in most common organic solvents. A few minutes heating of the polymer at 150° C. sufficed for its transformation into an infusible, insoluble resin.

In accordance with our invention, we have found that upon subjection of these polymers to heating at temperatures near the softening point thereof, for example 60–125° C., or above, for a sufficient period of time, they are converted into substantially infusible, insoluble, transparent, hard and wear-resistant products. The conversion appears to occur in the absence of catalysts and in some cases heat is unnecessary. The polymerization may be assisted, however, by the use of usual polymerization catalysts, such as oxygen, ozone, air, peroxides such as hydrogen peroxide, benzoyl peroxide, or basic or acidic catalyst, light, etc. When catalysts are used, it is found that the conversion of these products to the infusible state may be secured at somewhat lower temperatures than is necessary in the absence of catalysts. The application of super-atmospheric pressure also has been found to assist the transformation to the insoluble and infusible state.

The process herein described may be extended to the production of mixed polymers if desired. Thus, the fusible polymer prepared in accordance with our invention may be mixed with other polymers such as polymers of methyl methacrylate, methyl chloroacrylate, vinyl acetate, vinyl chloride, styrene, etc., or with the monomeric acrylate, chloroacrylate, vinyl chloride, etc., and the mixture is subjected to conditions of polymerization.

My operation in accordance with the present invention, it is possible to form a molded article from the fusible polymer such as the fusible allyl or methallyl, polyvinyl, polyallyl, polymethallyl, or polycrotyl acrylate, methacrylates, crotonates, or chloroacrylates referred to, and thereafter to render the molded article insoluble and infusible by heat. In this manner, we are able to prepare transparent, hard and infusible molded products which have many of the desirable properties of the conventionally known thermoplastic resins as well. Extrusion molding processes may be resorted to for this purpose and it is found that the temperature and pressure within the extrusion die and the catalyst concentration of the polymer may be controlled so that the polymer becomes infusible as it leaves the extrusion die or a short time thereafter. This method of molding is of particular importance since it permits the formation of fracture-free products. Thus, while attempts to cast polymerize allyl methacrylate generally result in the formation of a fractured product, it is possible to avoid all fractures by operating in accordance with the present invention.

A large number of inert substances may be incorporated with the fusible polymer before subjecting to molding conditions. Suitable for such purposes are: fillers, such as wood flour, mica, cotton flock, etc., plasticizers, such as dibutyl phthalate, dicyclohexyl phthalate, triacetin, tricresyl prosphate, natural and synthetic resins, pigments, including titanium dioxide, carbon black, chromic oxide, lead chromate, etc., and organic dyestuffs such as methylene blue, methyl orange, etc.

The unsaturated polymers prepared in accordance with the present invention are capable of numerous uses, such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article exposed to heat or light to render the surface infusible. In this manner, it is possible to surface other polymers which are less resistant to the action of solvents or of heat. When a coating of the fusible ploymer prepared as herein described is deposited upon polymerized methyl methacrylate or similar polymer and the solvent removed, a coherent surface thereof is formed. Upon heating the coated article to suitable temperatures, this surface may be made transparent, hard and infusible.

Being of the thermosetting type, these resins do not exhibit the phenomenon of "cold flow" and are thus especially suited to the production of accurately machined or molded articles where retention of original dimensions is important. Coatings may also be applied to metal, glass, wood, synthetic resins, etc. surfaces by extrusion of the heated fusible polymer directly on the suitably prepared surface. In similar manner, the surface may be heated and the polymer applied in powdered form, whereupon fusion occurs first to give a smooth, homogeneous film which may then be heat-hardened.

Although the present invention has been described with reference to the specific details of certain embodiments thereof, it is not intended that such details shall be regarded as limitations upon the scope of the invention except insofar as included in the accompanying claims.

We claim:

1. A method of forming a polymer which is substantially infusible and insoluble which comprises esterifying polyvinyl alcohol with a monomeric, monounsaturated lower aliphatic monocarboxylic acid to form an unsaturated polymerizable ester without substantial polymerization of said ester thereof and subsequently polymerizing the resulting ester.

2. A method of forming a polymer which comprises esterifying polymerized allyl alcohol with methacrylic acid while minimizing polymerization of the ester and thereafter polymerizing the ester.

3. A polymerizable ester of (a) monomeric methacrylic acid and (b) a polymer of a monounsaturated mono-hydroxy lower aliphatic alcohol.

4. A polymerizable ester of (a) a monomeric monounsaturated lower aliphatic monocarboxylic acid and (b) polymerized allyl alcohol.

5. An unsaturated methacrylic acid ester of polymerized allyl alcohol containing unpolymerized methacrylate groups.

6. A method of forming a polymer which comprises esterifying a polymerized monounsaturated monohydric, lower aliphatic alcohol with a monomeric monounsaturated lower aliphatic monocarboxylic acid while minimizing polymerization of the ester and thereafter polymerizing the ester.

7. A method of forming a polymer which comprises esterifying a polymerized monounsaturated monohydric, lower aliphatic alcohol with methacrylic acid while minimizing polymerization of the ester and thereafter fusing and polymerizing the ester.

8. A method of forming a polymer which comprises esterifying polymerized allyl alcohol with methacrylic acid while minimizing polymerization of the ester and thereafter fusing and polymerizing the ester.

9. A method of forming a polymer which comprises esterifying polymerized allyl alcohol with a monomeric monounsaturated lower aliphatic monocarboxylic acid while minimizing polymerization of the ester and thereafter fusing and polymerizing the ester.

IRVING E. MUSKAT.
MAXWELL A. POLLACK.